US012576379B2

(12) United States Patent
Natarajan

(10) Patent No.: US 12,576,379 B2
(45) Date of Patent: Mar. 17, 2026

(54) APPARATUS AND METHOD FOR PREPARATION OF NEGATIVE ELECTRODE MATERIAL

(71) Applicant: Epsilon Advanced Materials PVT Ltd, Mumbai (IN)

(72) Inventor: Chinnasamy Natarajan, Mumbai (IN)

(73) Assignee: Epsilon Advanced Materials PVT Ltd, Mumbai (IN)

( * ) Notice: Subject to any disclaimer, the term of this patent is extended or adjusted under 35 U.S.C. 154(b) by 482 days.

(21) Appl. No.: 18/042,809

(22) PCT Filed: Sep. 7, 2022

(86) PCT No.: PCT/IB2022/058405
§ 371 (c)(1),
(2) Date: Feb. 24, 2023

(87) PCT Pub. No.: WO2023/199108
PCT Pub. Date: Oct. 19, 2023

(65) Prior Publication Data
US 2024/0269633 A1 Aug. 15, 2024

(30) Foreign Application Priority Data
Apr. 13, 2022 (IN) .............................. 202221022188

(51) Int. Cl.
| | |
|---|---|
| *B01J 6/00* | (2006.01) |
| *C01B 32/205* | (2017.01) |
| *F27B 14/06* | (2006.01) |
| *F27D 1/12* | (2006.01) |
| *F27D 9/00* | (2006.01) |
| *F27D 99/00* | (2010.01) |
| *H01M 4/02* | (2006.01) |
| *H01M 4/583* | (2010.01) |
| *H05B 3/00* | (2006.01) |

(52) U.S. Cl.
CPC ............ *B01J 6/008* (2013.01); *C01B 32/205* (2017.08); *F27B 14/06* (2013.01); *F27D 1/12* (2013.01); *F27D 9/00* (2013.01); *F27D 99/0001* (2013.01); *H01M 4/583* (2013.01); *H05B 3/0004* (2013.01); *C01P 2006/40* (2013.01); *F27D 2009/0013* (2013.01); *F27D 2099/0025* (2013.01); *F27M 2003/14* (2013.01); *H01M 2004/027* (2013.01)

(58) Field of Classification Search
CPC .... B01J 6/008; F27D 1/12; F27D 9/00; F27D 9/0001; F27B 14/06; H01M 4/583; H05B 3/0004
See application file for complete search history.

(56) References Cited

U.S. PATENT DOCUMENTS

| | | | | |
|---|---|---|---|---|
| 4,394,766 A | * | 7/1983 | Karagoz | .............. H05B 3/0004 |
| | | | | 373/122 |
| 5,631,919 A | * | 5/1997 | Intermill | ................ C04B 35/52 |
| | | | | 373/122 |

\* cited by examiner

*Primary Examiner* — Yong L Chu
(74) *Attorney, Agent, or Firm* — Daniel A. Thomson; Emerson Thomson and Bennett

(57) ABSTRACT

The present disclosure provides an apparatus and method for preparation of negative electrode material using length-wise graphitization of carbon. The apparatus includes one or more graphite boxes, configured to store powdered coke. The one or more graphite boxes are enabled to be accommodated inside a refractory, encapsulated by a cooling jacket configured to regulate surface temperature of the apparatus. The one or more graphite boxes have one or more openings for refilling of powdered coke and collection of prepared material, the one or more openings being covered by one or more first lids and one or more heat insulating second lids. The apparatus includes one or more graphite electrodes coupled to the one or more graphite boxes and the refractory. One or more heating elements detachably coupled to the one or more graphite electrodes are enabled to receive electric power and uniformly heat the powdered coke.

10 Claims, 3 Drawing Sheets

100

ONE OR MORE
GRAPHITE BOXES
102

REFRACTORY
104

ONE OR MORE FIRST
LIDS
106

ONE OR MORE
SECOND LIDS
108

COOLING JACKET
110

ONE OR MORE
HEATING ELEMENTS
112

ONE OR MORE
GRAPHITE ELECTRODES
114

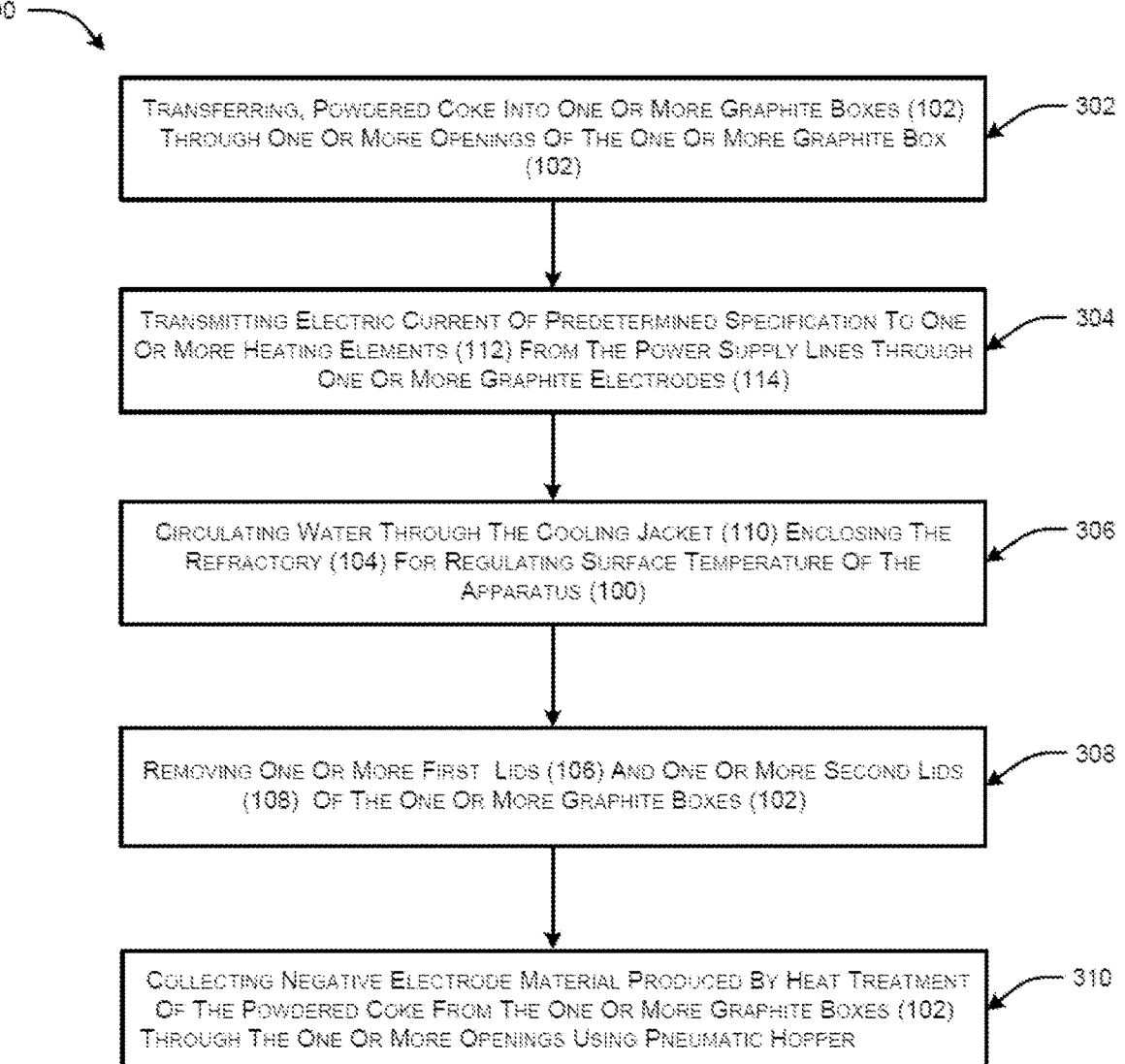

300

TRANSFERRING POWDERED COKE INTO ONE OR MORE GRAPHITE BOXES (102) THROUGH ONE OR MORE OPENINGS OF THE ONE OR MORE GRAPHITE BOX (102) — 302

TRANSMITTING ELECTRIC CURRENT OF PREDETERMINED SPECIFICATION TO ONE OR MORE HEATING ELEMENTS (112) FROM THE POWER SUPPLY LINES THROUGH ONE OR MORE GRAPHITE ELECTRODES (114) — 304

CIRCULATING WATER THROUGH THE COOLING JACKET (110) ENCLOSING THE REFRACTORY (104) FOR REGULATING SURFACE TEMPERATURE OF THE APPARATUS (100) — 306

REMOVING ONE OR MORE FIRST LIDS (106) AND ONE OR MORE SECOND LIDS (108) OF THE ONE OR MORE GRAPHITE BOXES (102) — 308

COLLECTING NEGATIVE ELECTRODE MATERIAL PRODUCED BY HEAT TREATMENT OF THE POWDERED COKE FROM THE ONE OR MORE GRAPHITE BOXES (102) THROUGH THE ONE OR MORE OPENINGS USING PNEUMATIC HOPPER — 310

FIG. 3

APPARATUS AND METHOD FOR PREPARATION OF NEGATIVE ELECTRODE MATERIAL

CROSS REFERENCE TO Related Application

The present application is a 35 U.S.C. 371 national stage application of a PCT International Application No. PCT/IB2022/058405, filed on Sep. 7, 2022, which claims the benefit of complete Indian Patent application number 202221022188 filed on Apr. 13, 2022, the entire disclosures of which are incorporated herein by reference.

TECHNICAL FIELD

The present disclosure relates to the field of graphitization device. More particularly, it relates to an apparatus and method for preparation of negative electrode material by heat treatment of carbon.

BACKGROUND

Background description includes information that may be useful in understanding the present disclosure. It is not an admission that any of the information provided herein is prior art or relevant to the presently claimed disclosure, or that any publication specifically or implicitly referenced is prior art.

Graphitization is the process of converting coke into Graphite, as negative electrode material that may be used in multiple applications. Traditionally graphitization was performed in Acheson furnace containing a graphite crucible that suffered from the disadvantages of low life due to oxidation and handling stress. Instead of multiple crucible, larger box type graphite container was used to hold powder material and current passed though the coke powder to do the heating. In this process, non-uniform heating observed due to island formation. Length-wise graphitization (LWG) method has been reported to have better energy efficiency and lower heating cycle than the Acheson process and has hence been used as an improved alternative over Acheson furnace.

Existing literature discloses an enclosed graphitization furnace based on Acheson principle. Another Acheson furnace for negative electrode material preparation for lithium batteries has been reported in prior-art. Acheson processes have higher energy consumption. A high temperature vacuum graphitization furnace has been described having series connected heating modules and heat shield. A negative electrode material sintering enclosed furnace has also been reported. Another disclosure describes an enclosed length-wise graphitization furnace that disposes prepared material through a gate valve. But it does not disclose cooling facilities for the furnace. Prior-art also describes a box-type graphitization furnace for anode material preparation of lithium batteries, but it does not disclose threaded electrical contacts between the electrodes and the heating elements of the furnace. Therefore there is need in the art to develop an apparatus and method for length-wise graphitization in an enclosed furnace that features lower energy requirement, low heating cycle, low operational cost, higher life cycle of the furnace and uniform product quality.

The proposed apparatus and method discloses an enclosed box-type length-wise graphitization device that can generate uniformly heated negative electrode material at lower power per unit mass of produced material. The proposed apparatus uses threaded electrical contacts between the electrodes and the heating elements, thereby reducing cost for hydraulic coupling. Produced material can be collected pneumatically by removal of only a part of the graphite box containing the heat treated carbon material. Also the apparatus has been designed such that the entire graphite box is not heated, apart from having additional cooling provisions. This enhances the life span of the apparatus and reduces cost for replacement. The proposed design is user friendly and has heat protective features.

Objects of the Present Disclosure

Some of the objects of the present disclosure, which at least one embodiment herein satisfies are as listed herein below.

It is an object of the present disclosure to provide an apparatus for negative electrode material preparation using length-wise graphitization of carbon.

It is an object of the present disclosure to provide an apparatus for negative electrode material preparation that includes one or more graphite boxes configured to store powdered coke.

It is an object of the present disclosure to provide an apparatus for negative electrode material preparation that includes a refractory configured to accommodate the one or more graphite boxes.

It is an object of the present disclosure to provide an apparatus for negative electrode material preparation that includes a cooling jacket coupled to outer surface of the refractory, the cooling jacket pertaining to regulation of surface temperature of the device.

It is an object of the present disclosure to provide an apparatus for negative electrode material preparation that includes one or more first lids configured to cover one or more openings of the one or more graphite boxes during heat treatment of powdered or solid coke and graphite.

It is an object of the present disclosure to provide an apparatus for negative electrode material preparation that includes one or more second lids inseparably coupled to the one or more first lids.

It is an object of the present disclosure to provide an apparatus for negative electrode material preparation that facilitates the one or more second lids to be made of heat insulating material for facilitating safe operations by a user. The heat insulating material can be of carbon/graphite and ceramic material in different forms, such as powder, granules, felt or board.

It is an object of the present disclosure to provide an apparatus for negative electrode material preparation that enables a user to remove the one or more first and second lids for refilling of powdered coke and collection of prepared negative electrode material through the one or more openings of the one or more graphite boxes.

It is an object of the present disclosure to provide an apparatus for negative electrode material preparation that includes one or more heating elements configured to perform uniform heat treatment of the powdered coke, the one or more heating elements being located inside the one or more graphite boxes.

It is an object of the present disclosure to provide an apparatus for negative electrode material preparation that includes one or more graphite electrodes detachably coupled to the one or more heating elements through threaded contacts.

It is an object of the present disclosure to provide an apparatus for negative electrode material preparation that enables the one or more graphite electrodes to receive electric power from power supply lines and transmit the electric power to the one or more heating elements.

It is an object of the present disclosure to provide an apparatus for negative electrode material preparation that facilitates mounting of the one or more graphite electrodes at predetermined locations on walls of the one or more graphite boxes.

It is an object of the present disclosure to provide an apparatus for negative electrode material preparation that enables coupling of the one or more graphite electrodes with power supply lines, the one or more graphite electrodes being mounted in one or more holes in walls of the refractory.

It is an object of the present disclosure to provide a method for negative electrode material preparation that enables transferring of powdered coke into the one or more graphite boxes through the one or more openings of the one or more graphite boxes.

It is an object of the present disclosure to provide a method for negative electrode material preparation that enables passing electric current from the power supply lines to the one or more heating elements through the one or more graphite electrodes.

It is an object of the present disclosure to provide a method for negative electrode material preparation that enables circulating water through the cooling jacket.

It is an object of the present disclosure to provide a method for negative electrode material preparation that enables collection of prepared negative electrode material from the one or more graphite boxes after heat treatment upon removal of the one or more first and second lids.

The temperature of the heating zone of furnace is measured by optical device fixed at the center of the furnace connected through metal and graphite tube.

SUMMARY

The present disclosure relates to the field of graphitization device. More particularly, it relates to an apparatus and method for preparation of negative electrode material by heat treatment of carbon.

An aspect of the present disclosure pertains to an apparatus (100) for negative electrode material preparation using length-wise graphitization of carbon.

In an aspect the apparatus (100) may include one or more graphite boxes (102) configured to store powdered coke.

In an aspect, the apparatus (100) may include a refractory (104) configured to accommodate the one or more graphite boxes (102) from all sides and bottom.

In an aspect, the apparatus (100) may include a cooling jacket (110) coupled to outer surface of walls of the refractory (104), the cooling jacket pertaining to regulation of surface temperature of the apparatus (100).

In an aspect, the apparatus (100) may include one or more first lids (106) configured to cover one or more openings of the one or more graphite boxes (102) during heat treatment of powdered coke.

In an aspect, the one or more openings of the one or more graphite boxes (102) may be configured to facilitate refilling the one or more graphite boxes (102) with powdered coke and collecting of prepared negative electrode material after heat treatment.

In an aspect the one or more second lids (108) may be inseparably coupled to the one or more first lids (106), the one or more first lids being made of graphite.

In an aspect, the one or more second lids (108) may be made up of heat insulating material for facilitating safe operations by a user.

In an aspect, the apparatus (100) may include one or more heating elements (112) configured to perform uniform heating of the powdered coke, the one or more heating elements being located inside the one or more graphite boxes.

In an aspect, the apparatus (100) may include one or more graphite electrodes (114) detachably coupled to power supply lines and the one or more heating elements (112) through threaded contacts.

In an aspect, the one or more graphite electrodes (114) may be configured to receive electric power from power supply lines and transmit the electric power to the one or more heating elements (112).

In an aspect, the one or more graphite electrodes (114) may be mounted at predetermined locations on walls of the one or more graphite boxes (102).

In an aspect, the apparatus (100) may enable mounting of the one or more graphite electrodes (114) at one or more holes in walls of the refractory (104), the power supply lines being facilitated to be coupled to the one or more graphite electrodes (114) through the one or more holes.

An aspect of the present disclosure pertains to a method (300) for negative electrode material preparation using the apparatus (100) that may enable transferring of powdered coke by a user into the one or more graphite boxes (102) through the one or more openings of the one or more graphite boxes (102).

In an aspect the method (300) may enable transmission of electric current from power supply lines to the one or more heating elements (112) through the one or more graphite electrodes (114).

In an aspect, the method (300) may enable circulation of water through the cooling jacket.

In an aspect, the method (300) may enable removal of the one or more first (106) and the one or more second lids (108) by the user from the one or more openings of the one or more graphite boxes (102).

In an aspect, the method (300) may enable collection of prepared negative electrode material from the one or more graphite boxes (102) through the one or more openings of the one or more graphite boxes (102).

BRIEF DESCRIPTION OF THE ACCOMPANYING DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

The diagrams described herein are for illustration only, which thus are not limitations of the present disclosure, and wherein:

FIG. 3 illustrates an exemplary method (300) for preparation of negative electrode material in the proposed apparatus (100) in accordance with an embodiment of the present disclosure.

DETAILED DESCRIPTION

In the following description, numerous specific details are set forth in order to provide a thorough understanding of embodiments of the present invention. It will be apparent to one skilled in the art that embodiments of the present invention may be practiced without some of these specific details.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

While embodiments of the present invention have been illustrated and described in the accompanying drawings, the embodiments are offered only in as much detail as to clearly communicate the disclosure and are not intended to limit the numerous equivalents, changes, variations, substitutions and modifications falling within the spirit and scope of the present disclosure as defined by the appended claims.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all groups used in the appended claims.

Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims.

Various terms as used herein are shown below. To the extent a term used in a claim is not defined below, it should be given the broadest definition persons in the pertinent art have given that term as reflected in printed publications and issued patents at the time of filing.

The present disclosure relates to the field of graphitization device. More particularly, it relates to an apparatus and method for preparation of negative electrode material by heat treatment of carbon.

Figure 1:
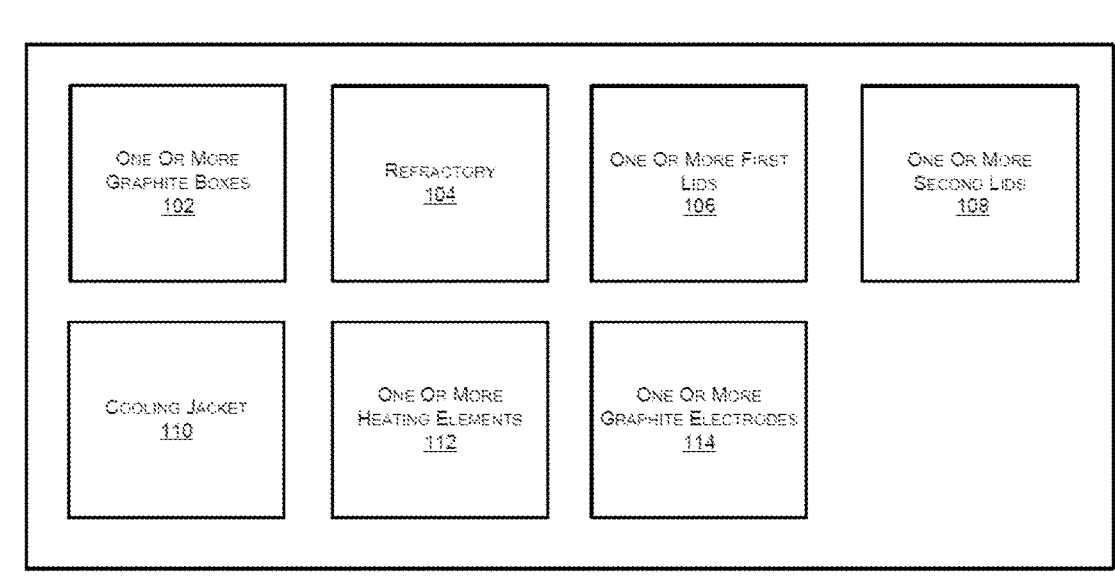
FIG. 1 illustrates exemplary block diagram of the proposed apparatus for preparation of negative electrode material (100) in accordance with an embodiment of the present disclosure.

FIG. 1 illustrates exemplary block diagram of the proposed apparatus for preparation of negative electrode material (100) in accordance with an embodiment of the present disclosure.

In an embodiment, proposed apparatus for preparation of negative electrode material (100) (interchangeably known as the apparatus (100), herein) may include one or more graphite boxes (102) that may be configured to store predetermined quantity of powdered coke, the powdered coke being the starting item for preparing negative electrode material. The one or more graphite boxes (102) may pertain to completely enclosed environment during heat treatment of the stored powdered coke. The one or more graphite boxes (102) may have one or more openings on one or more walls, the one or more openings being enabled to facilitate refilling of the powdered coke in the one or more graphite boxes (102) and collection of prepared negative electrode material from the one or more graphite boxes (102).

In an embodiment, the one or more graphite boxes (102) may have predetermined geometry and predetermined dimensions. By way of example, cross sectional geometry of the one or more graphite boxes may pertain to any of the shapes like but not limited to rectangle, square, circle, oval and polygonal. The geometry and the dimensions of the one or more graphite boxes (102) may be configured to facilitate accommodation of optimal amount of powdered coke in single heat treatment cycle.

In an embodiment, the apparatus (100) may include a refractory and carbon isolator (104) that may be configured to accommodate the one or more graphite boxes (102). Walls of the refractory (104) may have an inner surface and an outer surface, the inner and the outer surface of the walls being configured to have one or more holes to facilitate passage of power supply lines configured to provide electric power to the apparatus (100). In an embodiment, the refractory (104) may be open on the top and the inner surface of the refractory (104) may be configured to enclose the one or more graphite boxes (102) on sides and bottom of the one or more graphite boxes (102). Distance between inner surface of the refractory (104) and the one or more graphite boxes (102) may be of predetermined magnitude. By way of example, the refractory (104) may be made up of natural and synthetic materials including but not limited to any or a combination of alumina, fireclay, bauxite, chromite, dolomite, magnesite, silicon carbide and zirconia.

In an embodiment, the one or more graphite boxes (102) may be coupled to one or more supports configured to provide elevation to the one or more graphite boxes (102) from the inner surface of the refractory (104). The one or more supports may be made up of any or a combination of graphite and non-graphite materials and the one or more supports may be of predetermined dimensions.

In an embodiment, the apparatus (100) may have one or more first lids (106) that may be detachably coupled to the one or more graphite boxes (102), the one or more first lids (106) being configured to cover the one or more openings of the one or more graphite boxes (102). The one or more first lids (106) may be made up of graphite plates pertaining to providing complete closure to the one or more graphite boxes (102) during heat treatment of the powdered coke. Dimensions of the one or more first lids (106) may be predetermined according to size and shape of the one or more graphite boxes.

In an embodiment, the apparatus (100) may include one or more second lids (108) that may be inseparably coupled to the one or more first lids (106). In an exemplary embodiment, removal of the one or more second lids (108) by a user may pertain to removal of the one or more first lids (106) before and after heat treatment of the powdered coke. The one or more second lids (108) may be made up of heat insulating material, that may be configured to prevent conduction of heat from the one or more graphite boxes (102) to the user's hands through the one or more first lids (106). In an embodiment, the user may be enabled to remove the one or more first lids (106) and the one or more second lids (108) for collecting prepared negative electrode material from the one or more graphite boxes (102) and refilling the one or more graphite boxes (102) with powdered coke for a next heat treatment cycle.

In an embodiment, the apparatus (100) may include a cooling jacket (110) that may be adapted to cover predetermined sections of the outer surface of the refractory (104). The cooling jacket may be configured to contain water for regulating surface temperature of the apparatus (100). The cooling jacket (110) may be made up of material of predetermined composition including but not limited to ferrous, non-ferrous and alloys. In another embodiment, cooling technology implemented by the cooling jacket (110) may pertain to any or a combination of water cooling, air cooling, spray cooling and plate cooling. In an exemplary embodiment, the cooling jacket (110) may be facilitated to have one or more water inlets and one or more water outlets, the one or more water inlets being configured to facilitate entry of water into the cooling jacket (110) and the one or more water outlets being configured to facilitate exit of water from the cooling jacket (110). Frequency and duration of entry and exit of water into and from the cooling jacket (110) may be predetermined.

The apparatus (100) may include one or more heating elements (112) made of graphite that may be configured to receive electric power and correspondingly generate uniform heat within a predetermined region inside the one or more graphite boxes (102). The generated heat may be transmitted to the powdered coke contained in the one or more graphite boxes (102). The one or more heating elements (112) may be enclosed within the one or more graphite boxes (102) at predetermined locations. By way of example, the one or more heating elements (112) may pertain to any or a combination of materials including but not limited to nichrome, graphite, molybdenum disilicide, tungsten, silicon carbide and ceramic.

In an embodiment, the apparatus (100) may include one or more graphite feed electrodes (114) that may be coupled to the one or more heating elements (112) and to the power supply lines. The one or more graphite electrodes (114) may be enabled to receive electric power from the power supply lines and transmit the electric power to the one or more heating elements (112). In an embodiment, the one or more graphite electrodes (114) may be mounted at predetermined locations in the side walls of the one or more graphite boxes (102). The one or more holes in the inner and outer surface of the refractory (104) may be configured to facilitate mounting of the one or more graphite electrodes (114) for coupling with the power supply lines. By way of example the one or more graphite electrodes (114) may pertain to RP graphite electrodes, HD graphite electrodes, HP graphite electrodes, SHP graphite electrodes, UHP graphite electrodes and the likes. The predetermined location of the one or more graphite electrodes may be enabled to facilitate non-uniform distribution of heat inside the one or more graphite boxes (102). By way of example, the regions surrounding the heating elements and the powdered coke may pertain to the maximum allowable temperature attained and the walls of the one or more graphite boxes and the one or more first lids (106) may pertain to minimum allowable temperature.

In an embodiment, the one or more heating elements (112) may be detachably coupled to the one or more graphite electrodes (114) through threaded contacts that may be enabled to provide a set of predefined electrical properties. The one or more heating elements (112) may pertain to predetermined dimensions, the dimensions being configured to facilitate uniform heating of the powdered coke contained in the one or more graphite boxes (102), even under circumstances of island formation due to cracks in the heated and densified coke. Heat distribution, uniformity of negative electrode material produced and temperature attained in the one or more graphite boxes (102) may be predetermined in fashion depending on the location of placement of the one or more graphite electrodes (114) and the one or more heating elements (112) inside the one or more graphite boxes (102), specification of electric power received by the one or more graphite electrodes (114), duration of heating and the likes. In an exemplary embodiment, the one or more graphite boxes (102) may have one or more coaxial holes for mounting the one or more graphite electrodes (114), the one or more holes being configured to receive from an external power supply unit, the power supply lines that may be coupled to the one or more graphite electrodes (114).

In an embodiment, the one or more graphite electrodes (114) may be enabled to receive electric power from one or more power supply units through the power supply lines, the one or more power supply units pertaining to any or a combination of power lines, batteries and inverters. The electric power may pertain to any or a combination of alternating current, direct current, solar current, wind current, bio-gas current, thermal current and hydel current. Rating and duration of the received electric power may be predetermined. By way of example less than 14 kwh/kg power may be required for generating uniform heating of powdered coke.

Figure 2:
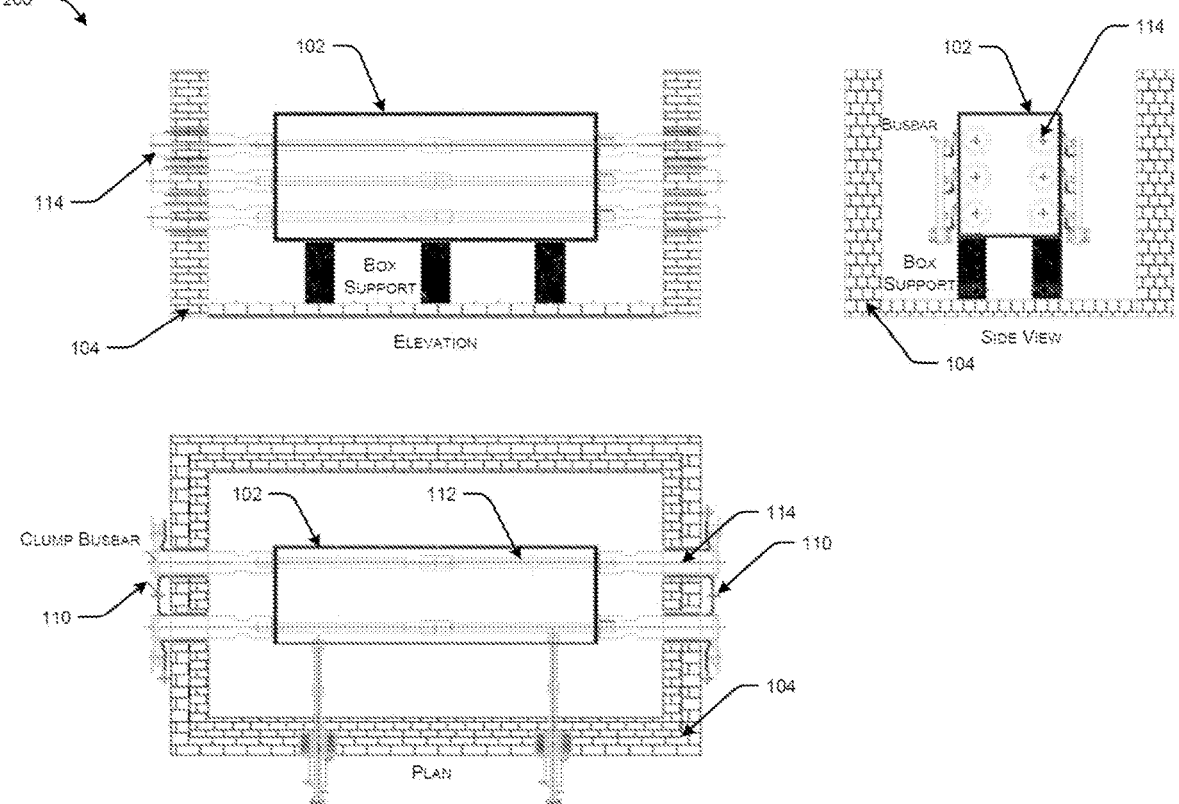
FIG. 2 illustrates exemplary views of the proposed apparatus for preparation of negative electrode material (100) in accordance with an embodiment of the present disclosure.

FIG. 2 illustrates exemplary views of the proposed apparatus for preparation of negative electrode material (100) in accordance with an embodiment of the present disclosure.

In an embodiment, the apparatus (100) may include one or more graphite boxes (102) configured to store powdered coke. The one or more graphite boxes (102) may be enabled to be accommodated inside a refractory (104). The refractory (104) may be encapsulated by a cooling jacket (110) configured to regulate surface temperature of the apparatus (100). The one or more graphite boxes (102) may be coupled to one or more supports that may be enabled to provide elevation to the one or more graphite boxes (102). The one or more graphite boxes (102) may have one or more openings for refilling of powdered coke and collection of negative electrode material, the one or more openings being covered by one or more first lids (not shown) and one or more heat insulating second lids (not shown). The apparatus (100) may include one or more graphite electrodes (114) coupled to the refractory (104) and the one or more graphite boxes (102) at one or more predetermined locations. The apparatus may include one or more heating elements (112) that may be detachably coupled to the one or more graphite electrodes (114), the one or more heating elements being configured to transmit heat uniformly to the powdered coke and correspondingly prepare the negative electrode material. The one or more graphite electrodes (114) may be enabled to receive electric power and transmit heat to the one or more heating elements (112). Walls of the one or more graphite boxes (102) and the refractory (104) may be configured to have one or more holes for mounting the one or more graphite electrodes (114) and facilitating passage of external power supply lines coupled to the one or more graphite electrodes (114).

FIG. 3 illustrates an exemplary method (300) for preparation of negative electrode material in the proposed apparatus (100) in accordance with an embodiment of the present disclosure.

In an embodiment, the method (300) for preparation of negative electrode material in the proposed apparatus (100) (interchangeably known as the method (300), herein) may include a step of (302) pertaining to transferring of the powdered coke to the one or more graphite boxes (102)

through the one or more openings of the one or more graphite boxes (102) by the user. The step (302) may include removal of the one or more first lids (106) and the one or more second lids (108) by the user prior to refilling the one or more graphite boxes (102) by powdered coke.

In an embodiment, the method (300) may include a step of (304) pertaining to transmission of electric current of predetermined specification to the one or more heating elements (112) from the power supply lines through the one or more graphite electrodes (114) based on user inputs configured to control the power supply. In an embodiment, the activation of electric power transfer and duration of transmission of electric current may be configured to be automatically controlled by one or more processors coupled to the power supply unit delivering electric power.

In an embodiment, graphitization at different current densities has been illustrated in Table 1. To achieve the different current densities, the electrode sizes may be changed. In the following Table, cycle time pertains to time to achieve 2800° C. temperature. Corresponding capacity and efficiency may be measured in coin cell similar to one described in our earlier patent.

TABLE I

| | Graphitization at different current density and corresponding capacity and efficiency | | | |
| SL. No | Max. Current Density (A/sq · cm) | Cycle Time (hrs.) | Reversible Capacity (mAh/g) | $1^{st}$ cycle efficiency (%) |
| --- | --- | --- | --- | --- |
| 1 | 25 | 75 | 343 | 93.1 |
| 2 | 40 | 55 | 355 | 94.3 |
| 3 | 55 | 35 | 359 | 93.5 |
| 4 | 70 | 28 | 358 | 92.5 |
| 5 | 85 | 23 | 355 | 92.1 |

In an embodiment, the method (300) may include a step of (306) pertaining to circulation of water through the cooling jacket (110) enclosing the refractory (104) for regulating surface temperature of the apparatus (100). The user may be enabled to determine the starting and duration of water circulation. In another embodiment, circulation of water in the cooling jacket (110) may be configured to be automatically controlled by one or more processors coupled to a water supply unit coupled to the cooling jacket (110).

In an embodiment, the method (300) may include a step of (308) pertaining to partial or complete removal by the user of the one or more first lids (106) and the one or more second lids (108) from the one or more openings of the of the one or more graphite boxes (102). The heat insulating property of the one or more second lids (108) may be enabled to protect the user's hands from the heat inside the one or more graphite boxes (102).

In an embodiment, the method (300) may include a step of (310) pertaining to collection by the user of the negative electrode material produced by the heat treatment of the powdered coke from the one or more graphite boxes (102) through the one or more openings of the one or more graphite boxes (102) using pneumatic hopper.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

The terms, descriptions and figures used herein are set forth by way of illustration only. Many variations are possible within the spirit and scope of the subject matter, which is intended to be defined by the following claims and their equivalents in which all terms are meant in their broadest reasonable sense unless otherwise indicated.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

Advantages of the Invention

The present disclosure provides for an apparatus for negative electrode material preparation using length-wise graphitization of carbon.

The present disclosure provides for an apparatus for negative electrode material preparation that includes one or more graphite boxes configured to store powdered coke.

The present disclosure provides for an apparatus for negative electrode material preparation that includes a refractory configured to accommodate the one or more graphite boxes.

The present disclosure provides for an apparatus for negative electrode material preparation that includes a cooling jacket coupled to outer surface of the refractory, the cooling jacket pertaining to regulation of surface temperature of the device.

The present disclosure provides for an apparatus for negative electrode material preparation that includes one or more first lids configured to cover one or more openings of the one or more graphite boxes during heat treatment of powdered coke.

The present disclosure provides for an apparatus for negative electrode material preparation that includes one or more second lids inseparably coupled to the one or more first lids.

The present disclosure provides for an apparatus for negative electrode material preparation that facilitates the one or more second lids to be made of heat insulating material for facilitating safe operations by a user.

The present disclosure provides for an apparatus for negative electrode material preparation that enables a user to remove the one or more first and second lids for refilling of powdered coke and collection of prepared negative electrode material through the one or more openings of the one or more graphite boxes.

The present disclosure provides for an apparatus for negative electrode material preparation that includes one or more heating elements configured to perform heat treatment of the powdered coke, the one or more heating elements being located inside the one or more graphite boxes.

The present disclosure provides for an apparatus for negative electrode material preparation that includes one or more graphite electrodes detachably coupled to the one or more heating elements through threaded contacts.

The present disclosure provides for an apparatus for negative electrode material preparation that enables the one or more graphite electrodes to receive electric power from power supply lines and transmit the electric power to the one or more heating elements.

The present disclosure provides for an apparatus for negative electrode material preparation that facilitates mounting of the one or more graphite electrodes at predetermined locations on walls of the one or more graphite boxes.

The present disclosure provides for an apparatus for negative electrode material preparation that enables coupling of the one or more graphite electrodes with power supply lines, the one or more graphite electrodes being mounted in one or more holes in walls of the refractory.

The present disclosure provides for a method for negative electrode material preparation that enables transferring of powdered coke into the one or more graphite boxes through the one or more openings of the one or more graphite boxes.

The present disclosure provides for a method for negative electrode material preparation that enables passing electric current from the power supply lines to the one or more heating elements through the one or more graphite electrodes.

The present disclosure provides for a method for negative electrode material preparation that enables circulating water through the cooling jacket.

The present disclosure provides for a method for negative electrode material preparation that enables collection of prepared negative electrode material from the one or more graphite boxes after heat treatment upon removal of the one or more first and second lids.

I claim:

1. An apparatus for preparation of negative electrode material (100) by length-wise graphitization, the apparatus comprising:

one or more graphite boxes (102), adapted to store powdered coke of predetermined quantity, wherein the one or more graphite boxes (102) have one or more openings configured to facilitate refilling of the one or more graphite boxes with the powdered coke and removal of the prepared negative electrode material from the one or more graphite boxes (102);

one or more first lids (106), detachably coupled to the one or more graphite boxes (102), wherein the one or more first lids (106) are configured to cover the one or more openings of the one or more graphite boxes (102);

one or more second lids (108), inseparably coupled to the one or more first lids (106), wherein removal of the one or more first lids (106) pertains to removal of the one or more second lids (108) for uncovering the one or more openings of the one or more graphite boxes (102);

one or more heating elements (112), adapted to be enclosed within the one or more graphite boxes (102) at predetermined locations, wherein the one or more heating elements (112) are configured to receive electric power and correspondingly generate heat, wherein the generated heat is transmitted to the powdered coke contained in the one or more graphite boxes (102);

one or more graphite electrodes (114) are detachably coupled to the one or more heating elements (112) through threaded contacts and to power supply lines, wherein the one or more graphite electrodes (114) are enabled to receive electric power from the power supply lines and transmit the electric power to the one or more heating elements (112), wherein, the one or more graphite electrodes (114) are mounted at predetermined locations in walls of the one or more graphite boxes (102);

a refractory (104), configured to accommodate the one or more graphite boxes, wherein the refractory has an inner surface and an outer surface and wherein the inner and the outer surface of the refractory (104) have one or more holes to facilitate mounting of the one or more graphite electrodes (114) and passage of the power supply lines coupled to the one or more graphite electrodes (114);

a cooling jacket (110), adapted to cover predetermined sections of the outer surface of the refractory (104), wherein the cooling jacket is configured to contain water for regulation of surface temperature of the apparatus (100).

2. The apparatus (100) as claimed in claim 1, wherein the one or more graphite boxes (102) are configured to have predetermined geometry and predetermined dimensions, wherein the geometry and the dimensions of the one or more graphite boxes (102) are configured to facilitate accommodation of optimal amount of powdered coke in single heat treatment cycle.

3. The apparatus (100) as claimed in claim 1, wherein the refractory (104) is open on the top and wherein the inner surface of the refractory (104) is configured to enclose the one or more graphite boxes (102) on sides and bottom of the one or more graphite boxes (102), wherein distance between inner surface of the refractory (104) and the one or more graphite boxes (102) is of predetermined magnitude.

4. The apparatus (100) as claimed in claim 1, wherein the one or more graphite boxes (102) are coupled to one or more supports configured to provide elevation to the one or more graphite boxes (102) from the inner surface of the refractory (104), wherein the one or more supports are made up of predetermined material and wherein the one or more supports have predetermined dimensions.

5. The apparatus (100) as claimed in claim 1, wherein the one or more first lids (106) are made up of graphite plates, wherein the one or more first lids (106) are configured to provide complete closure to the one or more openings of the one or more graphite boxes (102) during heat treatment of the powdered coke.

6. The apparatus (100) as claimed in claim 1, wherein the one or more second lids (106) are made up of heat insulating material, wherein the heat insulating material is configured to prevent conduction of heat from the one or more graphite boxes (102) to a user's hands through the one or more first lids (106), wherein the user is enabled to remove the one or more first lids (106) and the one or more second lids (108) for collecting prepared negative electrode material and refilling the one or more graphite boxes (102) with powdered coke.

7. The apparatus (100) as claimed in claim 1, wherein the cooling jacket (110) is made up of material of predetermined composition, wherein the cooling jacket (110) is facilitated to have one or more water inlets and one or more water outlets, wherein the one or more water inlets are configured to facilitate entry of water into the cooling jacket (110) and wherein, the one or more water outlets are configured to facilitate exit of water from the cooling jacket (110), wherein frequency and duration of entry and exit of water into and from the cooling jacket (110) are predetermined.

8. The apparatus (100) as claimed in claim 1, wherein the one or more heating elements (112) are of predetermined dimensions, the dimensions being configured to facilitate uniform heating of the powdered coke contained in the one or more graphite boxes (102), wherein generated heat is non-uniformly distributed within enclosure of the one or more graphite boxes (102), the heat distribution profile and temperature attained in the one or more graphite boxes (102) being predetermined in fashion.

9. The apparatus (100) as claimed in claim 1, wherein the one or more graphite electrodes (114) are enabled to receive electric power from one or more power supply units, the one or more power supply units pertaining to any or a combination of power lines, batteries and inverters, wherein the electric power pertains to any or a combination of alternating current, direct current, solar current, wind current, bio-gas current, thermal current and hydel current, wherein rating and duration of the received electric power is predetermined.

10. A method for preparation of negative electrode material (100) by length-wise graphitization in the apparatus (100), the method comprising the steps of:

transferring the powdered coke into the one or more graphite boxes (102) through the one or more openings of the one or more graphite boxes (102);

transmitting electric current of predetermined specification to the one or more heating elements (112) from the power supply lines through the one or more graphite electrodes (114);

circulating water through the cooling jacket (110) enclosing the refractory (104) for regulating surface temperature of the apparatus (100); removing the one or more first lids (106) and the one or more second lids (108) of the one or more graphite boxes (102) by the user;

collecting the negative electrode material produced by the heat treatment of the powdered coke from the one or more graphite boxes (102) through the one or more openings using pneumatic hopper.

* * * * *